(12) United States Patent
Paek et al.

(10) Patent No.: US 8,356,041 B2
(45) Date of Patent: Jan. 15, 2013

(54) PHRASE BUILDER

(75) Inventors: Timothy S. Paek, Sammamish, WA (US); Bongshin Lee, Issaquah, WA (US); Bo Thiesson, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 894 days.

(21) Appl. No.: 12/140,279

(22) Filed: Jun. 17, 2008

(65) Prior Publication Data

US 2009/0313572 A1 Dec. 17, 2009

(51) Int. Cl.
*G06F 17/00* (2006.01)
(52) U.S. Cl. ........................................ 707/756
(58) Field of Classification Search .......... 707/791–796, 707/802–804
See application file for complete search history.

(56) References Cited

U.S. PATENT DOCUMENTS

| | | | |
|---|---|---|---|
| 4,688,195 A | 8/1987 | Thompson et al. | |
| 5,559,945 A | 9/1996 | Beaudet et al. | |
| 5,708,829 A * | 1/1998 | Kadashevich et al. | 715/236 |
| 6,236,959 B1 | 5/2001 | Weise | |
| 6,411,950 B1 | 6/2002 | Moricz et al. | |
| 6,564,213 B1 | 5/2003 | Ortega et al. | |
| 6,766,069 B1 | 7/2004 | Dance et al. | |
| 6,859,908 B1 | 2/2005 | Clapper | |
| 7,149,550 B2 | 12/2006 | Kraft et al. | |
| 7,548,899 B1 | 6/2009 | Del Favero, Jr. et al. | |
| 2002/0087562 A1 | 7/2002 | Mcananey et al. | |
| 2004/0254928 A1 * | 12/2004 | Vronay et al. | 707/5 |
| 2005/0283473 A1 | 12/2005 | Rousso et al. | |
| 2006/0106769 A1 | 5/2006 | Gibbs | |
| 2006/0190436 A1 | 8/2006 | Richardson et al. | |
| 2006/0259479 A1 | 11/2006 | Dai | |
| 2006/0265648 A1 | 11/2006 | Rainisto et al. | |
| 2006/0293890 A1 | 12/2006 | Blair et al. | |
| 2007/0050351 A1 | 3/2007 | Kasperski et al. | |
| 2007/0050352 A1 | 3/2007 | Kim | |
| 2007/0061317 A1 | 3/2007 | Ramer et al. | |
| 2007/0157122 A1 | 7/2007 | Williams | |
| 2007/0162422 A1 | 7/2007 | Djabarov | |
| 2007/0168469 A1 | 7/2007 | Church et al. | |
| 2007/0250795 A1 | 10/2007 | Park | |
| 2007/0288433 A1 * | 12/2007 | Gupta et al. | 707/3 |
| 2008/0065617 A1 | 3/2008 | Burke et al. | |
| 2008/0086698 A1 | 4/2008 | Hellman et al. | |
| 2009/0049010 A1 * | 2/2009 | Bodapati | 707/3 |

(Continued)

OTHER PUBLICATIONS

White and Marchionini, Examining the effectiveness of real-time query expansion, May 2007, ScienceDirect.*

(Continued)

*Primary Examiner* — Wilson Lee
(74) *Attorney, Agent, or Firm* — Microsoft Corporation (57) ABSTRACT

Real-time query expansion (RTQE) is a process of supplementing an original query with additional terms or expansion choices that are ranked according to some figure of merit and presented while users are still formulating their queries. Individual terms may be combined and submitted as a phrase into a query. By building the phase term-by-term, users can compositionally formulate queries while maintaining the same benefits that other RTQE interfaces offer. The benefits include, reducing the number of keystrokes and improving retrieval performance. To promote greater flexibility in its working environment, the number of terms that are presented on a display may be reduced. In place of some terms, placeholders may be used and expanded by the user when necessary. This allows phrases to be readily presented on small displays (e.g., hand-held devices).

20 Claims, 9 Drawing Sheets

U.S. PATENT DOCUMENTS

2009/0055386 A1 2/2009 Boss et al.
2009/0282035 A1* 11/2009 Ferreira et al. .................... 707/6

OTHER PUBLICATIONS

Kamvar, et al. "The Role of Context in Query Input: Using contextual signals to complete queries on mobile devices", Proceedings of the 9th International Conference on Human Computer Interaction with Mobile devices Services, Singapore, 2007, pp. 405-412.
Dunlop, et al., "Predictive Text Entry Methods for Mobile Phones", Personal Technologies, 4 (2), 2008, pp. 1-10.
Jon Louis Bentley, "Multidimensional Binary Search Trees Used for Associative Searching", Communications of the ACM, vol. 18, No. 9, Sep. 1975, pp. 509-517.
Church, et al., "Mobile Content Enrichment", Proceedings of the 12th International Conference on Intelligent User Interfaces, Jan. 28-31, 2007, Honolulu, Hawaii, USA, pp. 112-121.
Church, et al., "Mobile Information Access: A Study of Emerging Search Behavior on the Mobile Internet", ACM Transactions on the Web, vol. 1, No. 1, Article 4, May 2007, pp. 1-38.
Church, et al., "K-Best Suffix Arrays", Proceedings of NAACL HLT 2007, Companion Volume, Rochester, NY, Apr. 2007, pp. 17-20.
Church, et al., "Towards More Intelligent Mobile Search", Proceedings of the 19th International Joint Conference on Artificial Intelligence, Edinburgh, Scotland, 2005, 3 pages.
Church, et al., "The Wild Thing!", Proceedings of the ACL Interactive Poster and Demonstration Sessions, Ann Arbor, Jun. 2005, pp. 93-96.
Cui, et al., "Probabilistic Query Expansion Using Query Logs", Proceedings of the 11th International Conference on World Wide Web, May 7-11, 2002, Honolulu, Hawaii, USA, pp. 325-332.
"Mobile Phones Could Soon Rival The PC As World's Dominant Internet Platform", Ipsos Insight, Apr. 18, 2006, pp. 1-3.
Jones, et al., "Sorting out Searching on Small Screen Devices", Proceedings of the 4th International Symposium on Mobile Human-Computer Interaction, 2002, pp. 81-94.
Kamvar, et al., "A Large Scale Study of Wireless Search Behavior. Google Mobile Searth", Proceedings of the SIGCHI Conference on Human Factors in Computing Systems, Apr. 22-27, 2006, Montreal, Quebec, Canada, pp. 701-709.
Koenemann, et at., "A Case for Interaction: A Study of Interactive Information Retrieval Behavior and Effectiveness", Proceedings of the SIGCHI Conference on Human Factors in Computing Systems: Common Ground, Vancouver, British Columbia, Canada, Apr. 13-18, 1996, pp. 205-212.
Lewis, et al., "Task-Centered User Interface Design", 1994, 190 pages.
MacKenzie, et al., "LetterWise: Prefix-based Disambiguation for Mobile Text Input", Proceedings of the 14th Annual ACM Symposium on User Interface Software and Technology, Orlando, Florida, 2001, pp. 111-120.
White, et al., "Examining the Effectiveness of Real-Time Query Expansion", Information Processing and Management: An International Journal, vol. 43, Issue 3, May 2007, pp. 1-33.
Wigdor, et al., "A Comparison of Consecutive and Concurrent Input Text Entry Techniques for Mobile Phones", Proceedings of the SIGCHI Conference on Human Factors in Computing Systems, vol. 6, No. 1, Vienna, Austria, Apr. 24-29, 2004, pp. 81-88.
Zhang, et al., "Mining Search Engine Query Logs for Query Recommendation", Proceedings of the 15th International Conference on World Wide Web, Edinburgh, Scotland, May 22-26, 2006, pp. 1039-1040.
Beaulieu, M. "Experiments with interfaces to support query expansion", Journal of Documentation, 1997, 53(1), 8-19.
Beaulieu, et al., ENQUIRE Okapi Project. British Library Research and Innovation Report 17, 1997.
Croft, et al., "I3R: A new approach to the design of document retrieval systems", Journal of the American Society for Information Science, 38(6), 389-404, 1987.
Fowkes, et al., "Interactive searching behavior. Okapi experiment for TREC-8. Proc. of the IRSG 2000 Colloquium on IR Research", 2000.
Bast, et al., "Type Less, Find More: Fast Autocompletion Search with a Succinct Index", <<http://www.mpi-inf.mpg.de/~hannah/papers/BastWeber-SIGIR2006.pdf>>, SIGIR'06, Aug. 6-11, 2006, Retrieved at. pp. 8.
Bast, et al., "Efficient Interactive Query Expansion with Complete Search", http://delivery.acm.org/10.1145/1330000/1321560/p857-bast.pdf?key1=1321560&key2=3092839121&coll=GUIDE&dl=GUIDE&CFID=173658&CFTOKEN=43151220 >>, CIKM'07, Nov. 6-8, 2007, pp. 857-860.
U.S. Appl. No. 12/140,280, filed Jun. 17, 2008, Paek et al.
U.S. Appl. No. 12/243,638, filed Oct. 1, 2008, Paek et al.
Non-Final Office Action Cited in related U.S. Appl. No. 12/140,280 Dated Dec. 27, 2010.
Reply to Non-Final Office Action Cited in related U.S. Appl. No. 12/140,280, filed Mar. 28, 2011.
Final Office Action Cited in related U.S. Appl. No. 12/140,280 Dated May 11, 2011.
Reply to Final Office Action Cited in related U.S. Appl. No. 12/140,280, filed Jul. 21, 2011.
Non-Final Office Action Cited in related U.S. Appl. No. 12/140,280 Dated Oct. 14, 2011.
Reply to Non-Final Office Action Cited in related U.S. Appl. No. 12/140,280, filed Jan. 17, 2012.
Final Office Action Cited in related U.S. Appl. No. 12/140,280 Dated Apr. 26, 2012.
Non-Final Office Action Cited in related U.S. Appl. No. 12/243,638 Dated Sep. 15, 2011.
Reply to Non-Final Office Action Cited in related U.S. Appl. No. 12/243,638, filed Dec. 15, 2011.
Notice of Allowance Cited in related U.S. Appl. No. 12/243,638 Dated Mar. 14, 2012.
"Hash table", taken from http://en.wikipedia.org/wiki/Hash_table, published 2004, 1 page.
Efthimiadis, Efthimis N., "Query Expansion" 1996, v31, pp. 121-187, http://faculty.washington.edu/efthimis/pubs/Pubs/qe-arist/QE-arist.html.
"T9 Translator" T9 Text Input, 2007, 1 pg., http://www.t9.com.
Bast, et al., "Output-Sensitive Autocompletion Search", Information Retrieval, vol. 11, Issue 4, Aug. 2008, Retrieved at <<http://www.mpi-inf.mpg.de/~hannah/papers/autocompletion-spire.pdf>>, pp. 12.
"Google Suggest" Retrieved Mar. 28, 2008, 1 pg., http://www.google.com/webhp?complete=1&hl=en.
Nandi, et al., "Effective Phrase Prediction", Proceedings of the 33rd International Conference on Very Large Data Bases, Vienna, Austria, 2007, pp. 219-230.
Reply to Final Office Action cited in U.S. Appl. No. 12/140,280 dated Jul. 26, 2012, 17 pgs.
Notice of Allowance cited in U.S. Appl. No. 12/243,638 dated Jul. 2, 2012, 5 pgs.

* cited by examiner

PHRASE BUILDER

BACKGROUND

Today, many computer-related applications help to facilitate quicker and more accurate text entry. For example, computers often have an auto-complete application that allows the computer to store terms that have been frequently typed, such as a website address, and fill in the missing terms whenever the user begins to reenter the terms at a later date.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

As provided herein, one or more techniques are disclosed that enhance a user's ability to arrive at a desired phrase by auto-completing or suggesting terms that may be desired in a search. In one example, a real-time query expansion (RTQE) interface on a hand-held device can be enhanced while lessening memory space requirements and increasing the usability and effectiveness of text entry for hand-held devices, such as cellular telephones, for example. An RTQE generally comprises one or more databases of terms or expansion choices that are associated in some manner such that when a user enters a first term or part of a first term, a second term or part of the first term is automatically produced.

As provided herein, a user is presented with a first list of predetermined terms in response to user input. The user may focus on a term from the first list, and upon focusing on a first term the user may be presented with a second list of terms where the second list of terms is a function of the term focused on in the first list. Lists of terms can be presented in a compact manner by representing one or more terms (e.g., that have a lower figure of merit) as a generic placeholder. Terms represented by a placeholder can be viewed by selecting the corresponding placeholder to zoom in on this collapsed segment of the list.

In one example, a user may begin to spell out a desired term (e.g., in a character entry field) and a first list (e.g., currently focused list) of predetermined terms may be presented that comprises often chosen terms beginning with those characters already entered. Additionally, where fewer than all of the terms in the first list are presented to a user (e.g., due to the compactness of a display), the terms that are presented may be those that have a higher figure of merit (e.g., according to some context of interest). Moreover, the contents of the first list that are displayed to a user may vary depending upon additional user input. For example, the contents of the first list that are displayed may be adjusted as a user spells out more of a desired term.

Once a user focuses on a term in the first list, a second list (e.g., subsequent list) may be presented. The second list, for example, may comprise terms that would commonly follow the term focused on in the first list. Additionally, where fewer than all of the terms in the second list are presented to the user (e.g., due to the compactness of a display), the terms that are presented may be those that have a higher figure of merit (e.g., as relates back to the term focused on in the first list). A user may then select a first term (e.g., by clicking a "select" button) and focus on a term in the second list. After a user selects a term in the first list and focuses on a term in the second list, a third list might be presented, etc. The user may continue to scroll through the lists in this manner until a desired phrase is selected. Once terms constructing a desired phrase are selected, the user may accept the phrase (e.g., by clicking an "accept" button), and the phrase will be presented in a character entry field. The user can also generate a new phrase, for example, by jumping back to a previous list, unselecting a term and selecting a different term.

This process allows the user greater flexibility in choosing phrases by letting the user select terms commonly associated with prior selected terms, rather than making the user select an entire phrase, as traditional RTQE interfaces require. It significantly expedites the process of creating a phrase by reducing the number of keystrokes, adding great convenience to a user; particularly on a handheld device since such devices typically have relatively small keys or other input mechanisms. Additionally, if a query is to be run using the accepted phrase, it increases the accuracy of the search by helping users select relevant terms that may aid in a search engine's retrieval process.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

Figure 1:
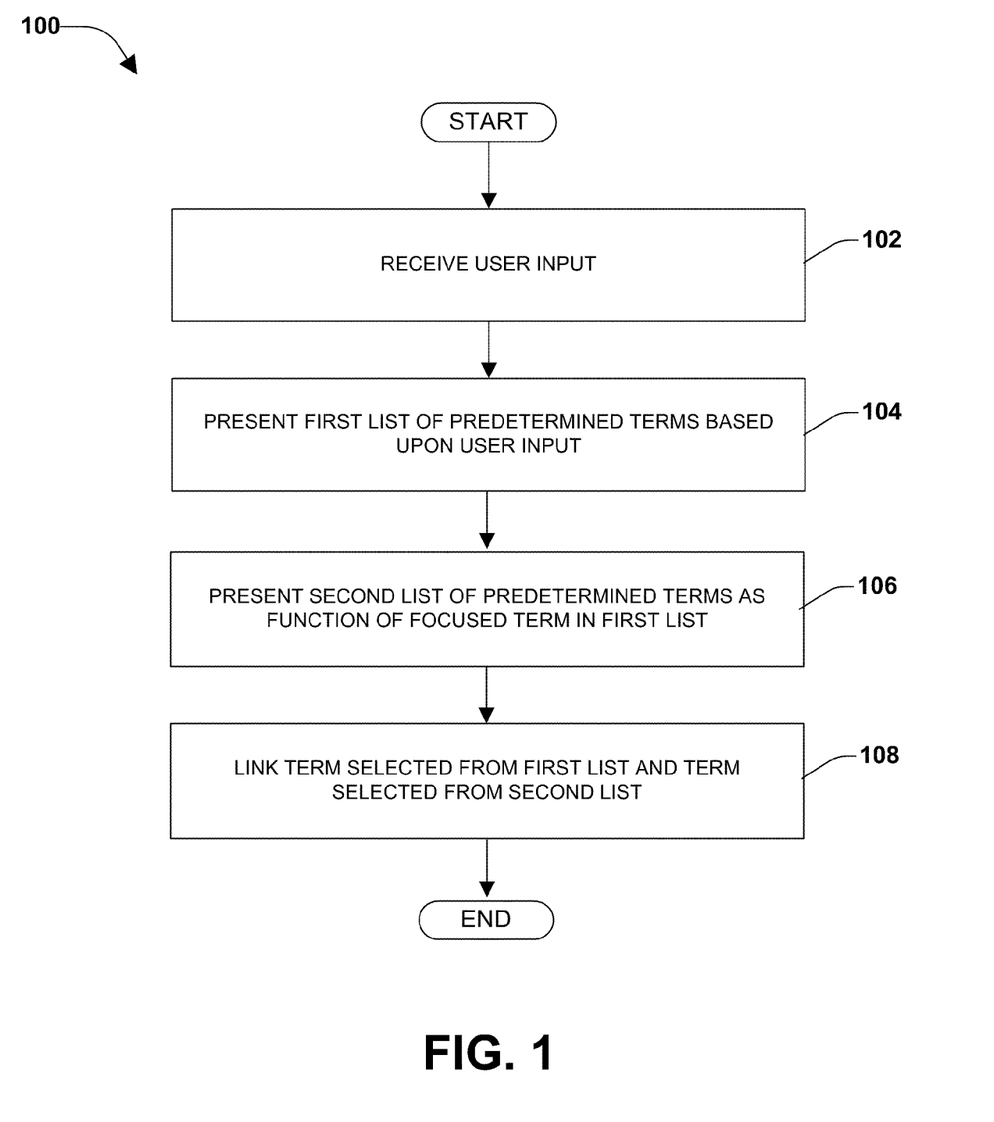
FIG. 1 is a flow chart illustrating an exemplary method of generating phrases using real-time query expansion.

Turning initially to FIG. 1, an exemplary methodology 100 is illustrated for building phrases using real-time query expansion (RTQE) by separately selecting terms linked with one another according to some criteria. In one example, the technique disclosed herein may be integrated into a standard auto-complete function, and the phrases can be so constructed and used for entering a query into a handheld device, such as a cellular telephone, for example. At 102 user input is received (e.g., from a Qwerty keyboard, a numeric keyboard, etc.). A user may begin to spell out part of the desired term by entering text into a character entry field, for example. A character may include, but is not limited to a letter, number, or symbol, for example. Further, it will be appreciated that receiving user input can include a variety of actions, including, for example, navigation into a drop-down menu and/or control to access previous queries and/or popular query logs, for example. In one example, a user may select a first term using a standard auto-complete function and navigate to the right once the first term is selected, to invoke the technique disclosed herein.

At 104 a first list (e.g., currently focused list) of predetermined terms is presented in a first manner based on the user input received. The terms may be presented according to some figure of merit. For example, where the size of a display upon which the list is going to be presented to a user is too small to accommodate all of the terms in the list, merely the ten or so terms in the list having higher figures of merit may be presented on the display (e.g., with undisplayed terms represented as a generic placeholder). Additionally, the term in the list having the highest figure of merit may be represented in a specific location on the list (e.g., the top of the list). One example of a figure of merit may comprise a consideration of the popularity of one or more terms (e.g., relative to some context of interest). A term might include, but is not limited to, a word, number, or symbol, for example, but generally does not include a complete phrase. A term in the first list may be focused on by user input. To focus on a term in the first list, the user may scroll to a term in the list and/or input (e.g., into a character entry field) a larger part of a desired term until the desired term is displayed, which can then be focused on by the user. Once the desired term is focused on, the user may select the term (e.g., by clicking a right arrow button).

At 106, a second list (e.g., a subsequent list) may be presented as a function of the focused on term in the first list. That is, if a user focuses on a different term in the first list, the terms displayed in the second list will be adjusted as different terms in the first list are focused on (e.g., highlighted). As an example, the second list of terms might be generated based on the most common term that would be typed after the term focused on in the first list to complete a phrase (e.g., those terms would have a higher figure of merit based upon the term focused on in the first list). In one example, fewer than all of the terms in the second list may be presented at once (e.g., due to the compactness of a display), and a placeholder may be used to represent undisplayed terms. In this situation, the terms in the second list that are displayed may have a higher figure of merit (e.g., as relates back to the term focused on in the first list). Once a term in the first list is selected, the user may focus on a term in the second list and select it.

Once a term in the first list and a term in the second list have been selected, the terms are linked to form a phrase at 108 and accepted (e.g., by the user). It will be appreciated that even though multiple terms are illustrated herein, that a phrase may merely comprise a single term (from a first/single column). The user may accept the phrase, causing it to be presented in a character entry field. An example of where the phrase may be used is on an Internet search engine. The process can be repeated for additional lists (e.g., additional, subsequent lists), the contents of which are a function of the term(s) selected in the prior list(s), and terms can be focused on in these lists to expand the phrase, for example. Alternatively, where additional lists are presented, a user can halt the process by accepting the phrase as constructed (e.g., presenting the phrase in a character entry field where a query is conducted based upon the currently established or constructed phrase).

Figures 2, 3:
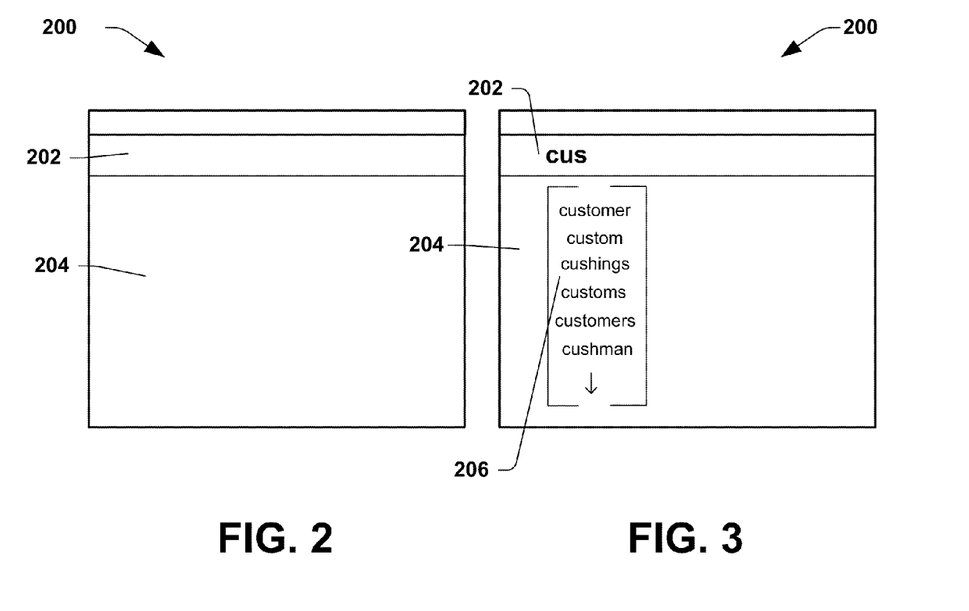
FIG. 2 illustrates an exemplary phrase builder interface before any character(s) are entered into a character entry field.
FIG. 3 illustrates an exemplary phrase builder interface after characters are entered into a character entry field and a list of terms is presented.

By way of example, FIGS. 2-9 demonstrate at least some of the advantages of building a phrase term by term (e.g., as provided in FIG. 1). FIG. 2 illustrates a display 200, comprising a character entry field 202 and a field for displaying a list(s) of predetermined terms 204. It will be appreciated that the field for displaying the list(s) of predetermined terms 204 is empty because the device disclosed herein has not received any input from the user (e.g, the character entry field 202 is blank). It will be appreciated that even though an empty list is illustrated, a first list comprising terms that have a higher figure of merit can be presented by default.

FIG. 3 illustrates the display 200 once characters are received from the user. After the characters are received (e.g., as a result of user input) into the character entry field 202, a first list 206 of predetermined terms is presented in a first manner in the field for displaying the list(s) of predetermined terms 204. In the example illustrated, a predetermined term having a higher figure of merit relative to other terms in the list and corresponding to those characters already input by the user is displayed at the top of the list (e.g., "customer") and predetermined terms matching those characters already input by the user but having a lower figure of merit relative to the term presented at the top of the list presented is displayed below the term presented at the top (e.g., "custom"). It will be appreciated, however, that such a presentation is not necessary and that other presentation schemes are possible. It will also be appreciated that such terms do not need to be presented in alphabetical order.

Figure 4:
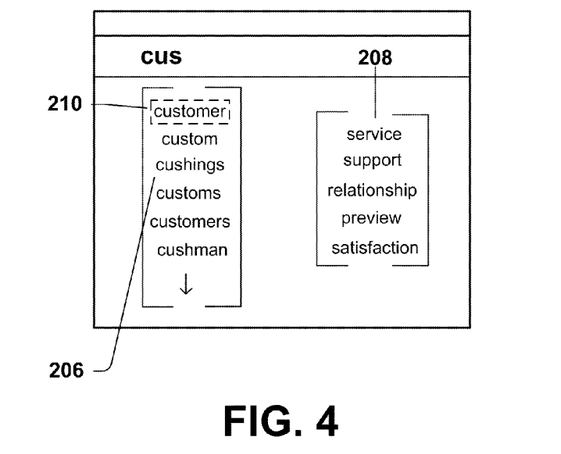
FIG. 4 illustrates an exemplary phrase builder interface after a first term is focused on in a first list and a second list of terms is presented as a function of the term focused on in the first list.

As FIG. 4 illustrates, a second list 208 of predetermined terms may be presented in a first manner where a term 210 from the first list 206 is focused on (e.g., by the user). In the illustrated example, the term focused on is in a box. It will be appreciated, however, that focused term can be presented in other distinguishing manners, such as underlined, different colors, encircled, etc. The terms presented in the second list 208 are a function of the focused term 210 in the first list and may be displayed, for example, according to some figure of merit (e.g., a term with the highest figure of merit is displayed at the top of the second list, a term with the second highest figure of merit is displayed second in the second list, etc.) relative to the focused term 210 in the first list 206. The user may augment the terms displayed in the second list 208 (e.g., by focusing on a different first term in the first list). For example, the terms displayed in the second list 208 may be augmented because the terms previously displayed in the second list 208 no longer have a higher figure of merit when a different term in the first list 206 is focused on, for example. It will be also be appreciated that the terms in the different lists (e.g., first, second, third, etc. and/or currently focused, subsequent, etc.) may be altered based upon the available real estate on a display. For example, terms can be respectively added to or deleted from a list when a larger or smaller display screen is used. Similarly, more terms of a list may be presented on a device having a larger display screen while fewer terms of the same list may be presented on a different device having a smaller display screen.

Figure 5:
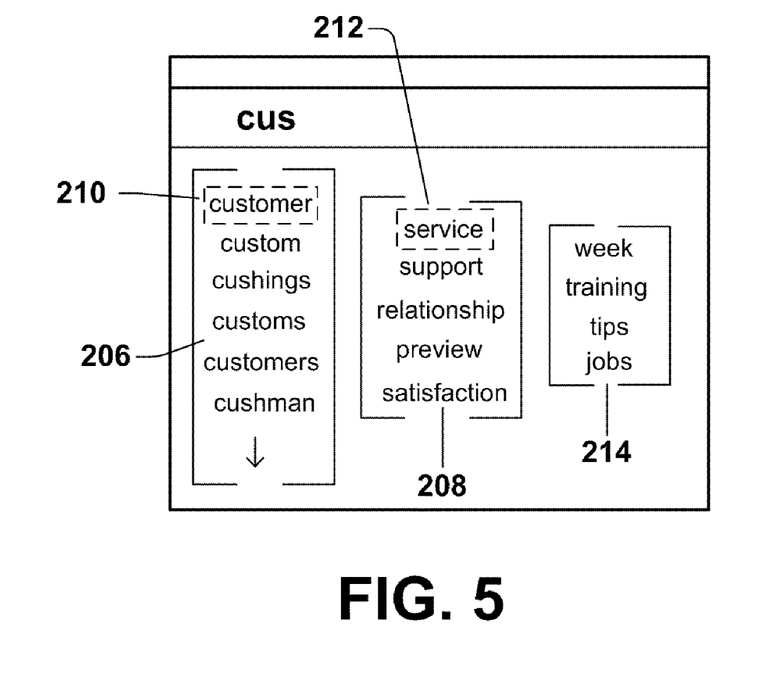
FIG. 5 illustrates an exemplary phrase builder interface after a first term is selected in a first list, a second term is focused on in a second list, and a third list of terms is presented as a function of the term selected in the first list and focused on in the second list.

As illustrated in FIG. 5, a user may focus on a term 212 from the second list 208 once a term 210 from the first list 206 is selected (e.g., by clicking a right arrow button when a term from the first list that is desired is focused on). It will be appreciated that other terms that are not selected in the first list can be deemphasized (e.g., grayed out). A third list 214 of predetermined terms may be presented in a first manner where a term 212 is focused on from the second list 208 (e.g., "service") and a term 210 is selected (e.g., "customer") from the first list 206. The terms presented in the third list 214 comprise terms having a higher figure of merit, for example, based upon the selected term 210 in the first list 206 and the focused term 212 in the second list 208. Additionally, as in the first list 206 and second list 208, where fewer than all of the terms in the third list 214 are displayed, those terms that are presented in the first manner may have a higher figure of merit, for example. In one example, the user may alter the selected term 210 in the first list 206 after a term 212 from the second list 208 has been selected. The user may select a different first term, for example, by returning to the first list 206 and unselecting the selected term 210 (e.g., causing the second list 208 to be augmented if a different first term is focused on and the third list 214 to not be presented). Additional lists of predetermined terms can be displayed in a similar manner based upon selected and/or focused terms in previous lists.

Figure 6:
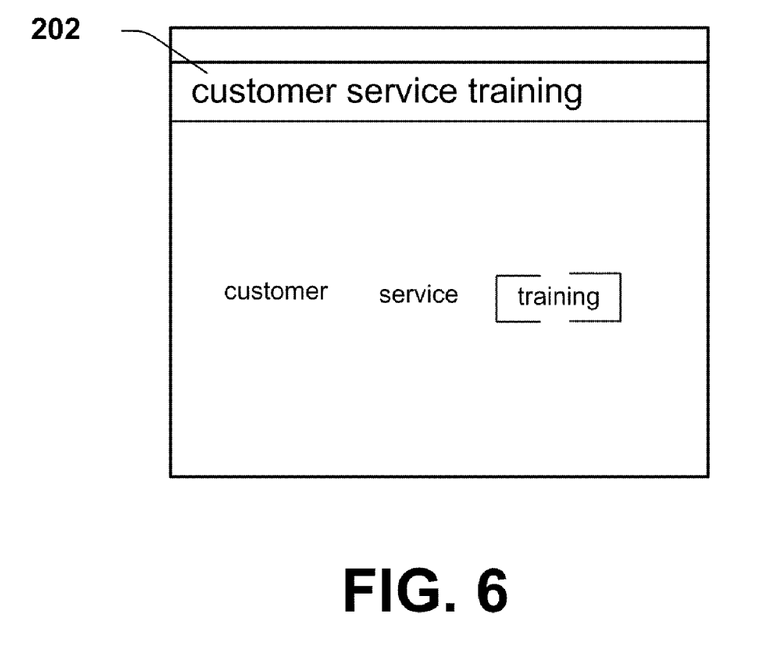
FIG. 6 illustrates an exemplary phrase builder interface after terms are accepted.

FIG. 6 illustrates what occurs once a desired phrase is constructed. The user may accept the phrase constructed from the selected terms (e.g., by clicking an "accept" button) and the accepted phrase may be presented in the character entry field 202. In the illustrated example, the accepted phrase, "customer service training," may then be used to conduct an Internet search.

Figures 7, 8:
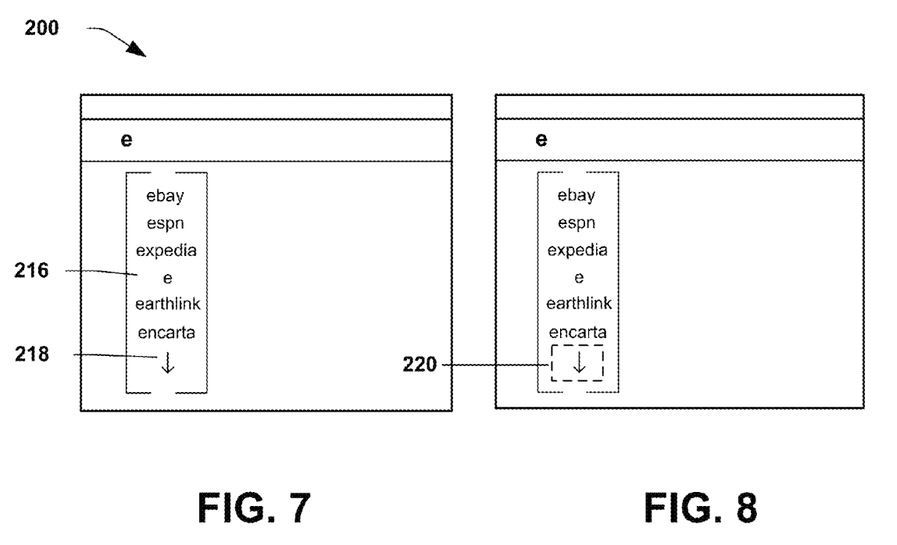
FIG. 7 illustrates an exemplary phrase builder interface when one or more terms in a list are unable to be presented in a first manner and a placeholder is used.
FIG. 8 illustrates an exemplary phrase builder interface as a user is focusing on a placeholder.
Figure 9:
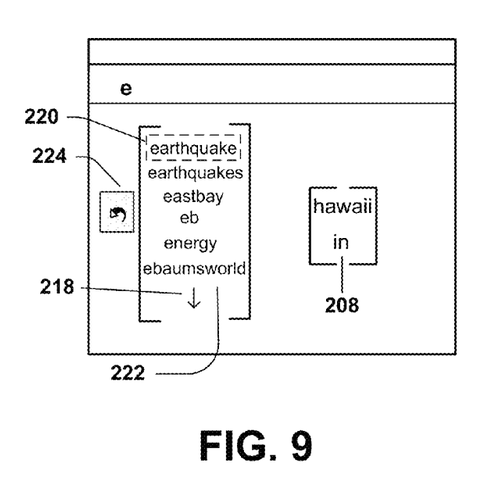
FIG. 9 illustrates an exemplary phrase builder interface once a placeholder is selected and terms are presented in a second manner.

As FIG. 7 illustrates, in some instances, one or more of the terms in a list may not be displayed (e.g., when there are limitations on the size of the display 200). For example, where the size of a display 200 upon which the list is going to be presented to a user is too small to accommodate all of the terms in the list, merely the ten or so terms in the list having higher figures of merit may be displayed. Where terms are unable to be displayed, the list may be presented in a first manner 216 and a generic placeholder 218 may be used as a substitute for the undisplayed term(s). The terms presented in the first manner 216 may have a higher figure of merit (e.g., their relative popularity) relative to other terms on the list, for example, and a placeholder 218 is used to represent terms with a lower figure of merit. In the illustrated example, an arrow is presented below the last term displayed to indicate that there are other relevant terms that are unable to be displayed (e.g., because of the size of the display). The placeholder 218 can be presented even if terms presented in the first manner 216 change (e.g., different terms are presented with a higher degree of merit relative to those that are not presented because of additional user input).

In FIG. 8, the placeholder 218 is focused on by the user. When the user zooms into the placeholder, some terms in the list, not able to be presented in the first manner, are presented in a second manner 222 in FIG. 9. In the illustrated example, terms with a lower figure of merit relative to those terms displayed in the first manner 216 but with a higher figure of merit relative to other terms on the list are presented in the second manner 222. It will be appreciated that when a focused placeholder 218 is unfocused on, the list of may be presented in the first manner 216. In the example illustrated, a user may select a back arrow 224 and the terms displayed when the list was presented in the first manner 216 will reappear (e.g., returning to the illustration in FIG. 7). It will also be appreciated that a placeholder 218 may be used in the presentation of terms in the second manner 222 where one or more terms in the list are unable to be displayed. If a term is focused on from the presentation of the list in a second manner 222, a second list 208 may be presented.

Figure 10:
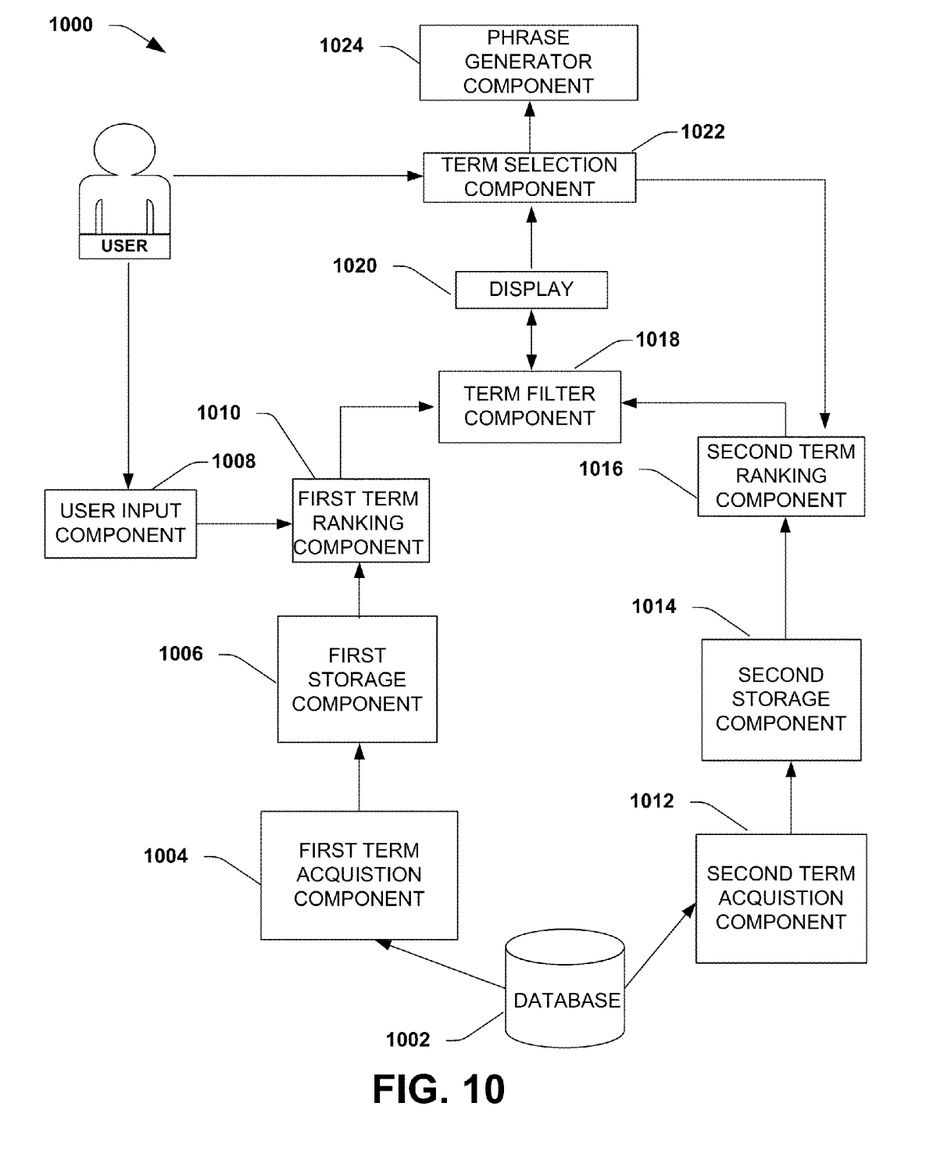
FIG. 10 is a component block diagram illustrating an exemplary system for facilitating phrase building.

FIG. 10 is a schematic block diagram of an exemplary system 1000 configured to assist a user in generating a phrase. In one example, the technique disclosed herein may be integrated into a standard auto-complete function on a cellular phone, for example. The system comprises a storage component (e.g., a database) of terms 1002, a first term acquisition component 1004 configured to obtain a first list (e.g., currently focused list) of terms, a first storage component 1006 configured to store the first list of terms, a user input component 1008 configured to receive user input, a first term ranking component 1010 configured to rank terms in the first list, a second term acquisition component 1012 configured to obtain a second list (e.g., subsequent list) of terms, a second term storage component 1014 configured to store the second list of terms, a second term ranking component 1016 configured to rank terms in the second list as a function of a focused (e.g., through user input) term in the first list, a term filter component 1018 configured to determine which ranked terms in the first and seconds lists are to be presented as a function of the size of an associated display, a display 1020 for displaying terms received from the term filter component, a term selection component 1022 configured to focus on and select a term as a function of user input, and phrase generator 1024 configured to generate a phrase based upon a term selected from the terms presented in the first list and a term selected from the terms presented in the second list.

The first and second term acquisition components 1004, 1012 obtain a first and second list respectively from the database 1002. The database may contain, for example, all terms commonly used to generate a query for a search engine. The acquired terms from the first and second term acquisition components 1004 and 1012 are then forwarded to the first and second storage components 1006, 1014, respectively. In one example, these terms are stored on a handheld device where terms with prefixes less than some threshold (e.g., as many characters as memory allows) are stored in a hash table and terms with prefixes greater than some threshold are stored in secondary and more memory efficient indexes.

The user input component 1008 receives any input the user provides (e.g., through a Qwerty keyboard, numerical keyboard, etc.). In one example, the input received from the user is displayed in a character entry field. The first term ranking component 1010 ranks the first terms as a function of input received in the user input component 1008 according to some figure of merit (e.g., popularity of the term, relevance of the term, etc.). In one example, if a user begins to type "cus," the terms that begin with "cus" will have a higher figure of merit than terms that being with "goo," for example. If the user input component 1008 receives more input from the user, the first term ranking component 1010 may adjust a term's figure of merit (e.g., to correspond to those newly added characters).

After the first term ranking component 1010 ranks the terms in the first list, the term filer component 1018 determines which terms will be displayed as a function of the size of an associated display 1020. For example, on a handheld device, the display may be capable of presenting only five terms in the first list prominently. Therefore, for example, the five terms from the first list with a higher rank would be presented more prominently. A placeholder, for example, may be used where terms on the list are unable to be presented in a first manner. The display 1020 then presents the list. In one example, the terms that are presented more prominently by the term filter component 1018 are ordered from the highest ranked term to the lowest ranked term relative to other terms on the list. If the desired term is not presented more prominently, the user may scroll through the list and/or input more characters of the desired term into the user input component 1008.

From the words presented, the term selection component 1022 focuses on one term from the first list as a function of user input (e.g., the user may scroll to a desired term, focus on it and select it). As a function of the term focused on from the first list, the second term ranking component 1016 ranks the terms stored in the second storage component 1014 according to some figure of merit. For example, if at the term selection component 1022 a user focuses on "customer" from the first list, terms that are commonly associated with "customer" (e.g., service, support, etc.) may be ranked higher than if the focused first term was "earthquake." In one example, a user may focus on a different first term and the second ranking component may lessen or increase a second term's figure of merit (e.g., to correspond to the newly focused first term).

After the second term ranking component 1016 ranks the terms in the second list, the term filer component 1018 determines which terms will be displayed as a function of the size of an associated display 1020. The display 1020 then presents the second list. In one example, the terms that are presented more prominently by the term filter component 1018 are ordered from the highest ranked term to the lowest ranked term relative to other terms on the list. After a term in the first list is focused on and selected at the term selection component 1022, the user may scroll through the second list until a desired second term is displayed and/or unselect the term selected from the first list, focus on a different term in the first list, and select it. Once the desired term from the second list is presented more prominently, the user may focus on and select the desired second term at the term selection component 1022. After the user focuses on a second term, a third list (e.g., another subsequent list) may be presented as a function of the selected first term and the focused second term. Additional list may be presented in this manner as needed to construct the desired phrase.

The phrase generator component 1024 links the term selected from the first list and the term selected from the second list to form a phrase that the user may accept. This phrase may then be inserted into a character entry field and used to conduct a query on an Internet search engine, for example.

Figure 11:
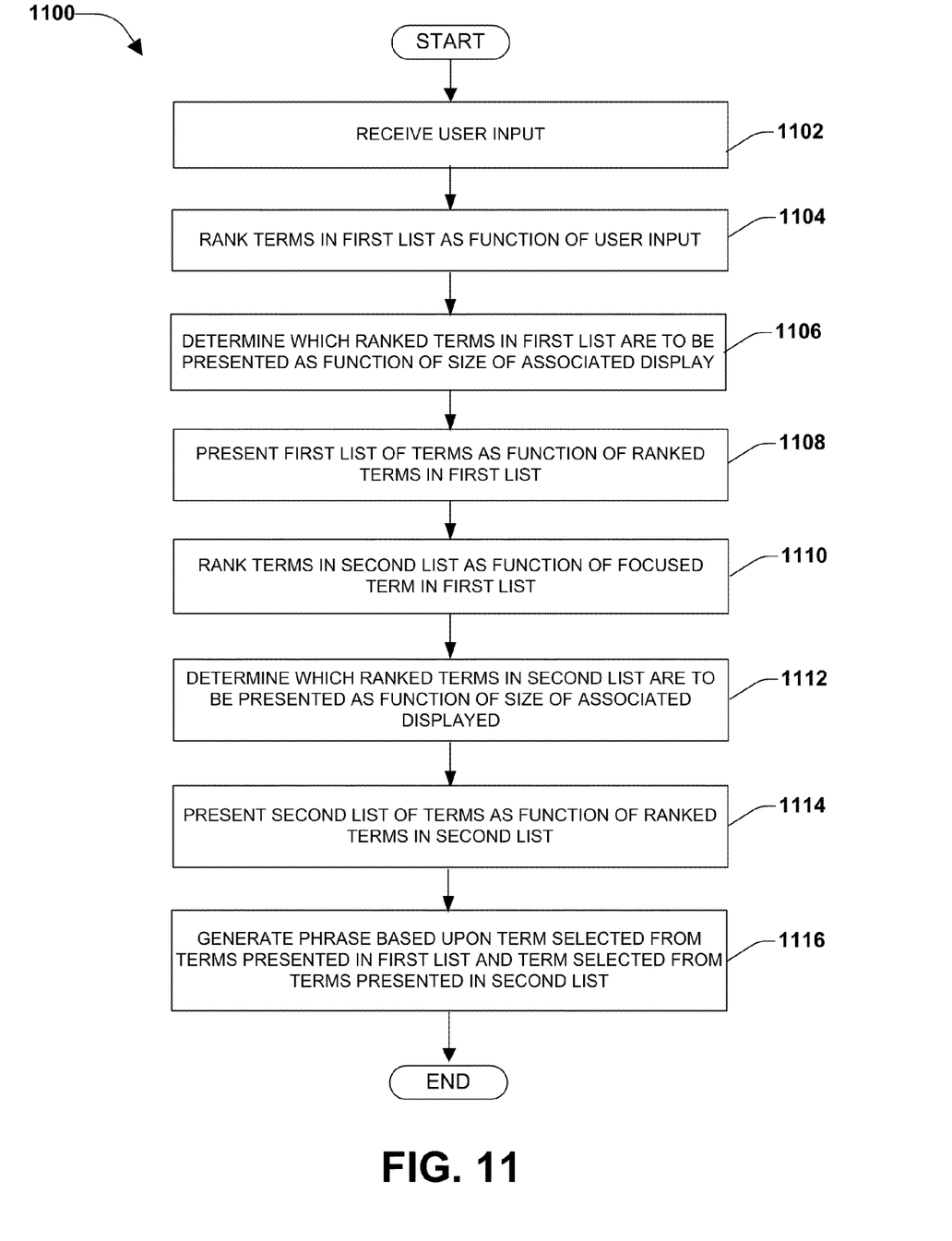
FIG. 11 is a flow chart illustrating an exemplary method of generating phrases using real-time query expansion.

FIG. 11 is an exemplary method 1100 for generating a phrase using real-time query expansion (RTQE) by separately selecting terms linked with one another according to some criteria. In one example, the technique disclosed herein may be integrated into a standard auto-complete function, and the phrases can be so constructed and used for entering a query into a handheld device, such as a cellular telephone, for example. The exemplary method begins at 1102 where user input is received (e.g., into a character entry field through some input device such as a Qwerty or numerical keyboard on a hand-held device, for example). Based on the input received from the user, a first list (e.g., currently focused list) of terms is ranked at 1104. The first list may be obtained from terms stored on a hand-held device, for example, and ranked according to some figure of merit, for example. In one example, terms having a higher figure of merit (e.g., more popular relative to some context of interest) and corresponding to the characters already input by the user will be ranked higher than terms with a lower figure of merit. As a function of the size of an associated display, a certain number of terms on the first list may be displayed at 1106 (e.g., with undisplayed terms represented as a generic placeholder). For example, where the size of a display upon which the list is going to be presented to a user is too small to accommodate all of the terms in the list, merely the ten or so terms in the list having a higher figure of merit may be presented on the display. The first list is then presented at 1108 in a ranked order (e.g., the term with the highest figure of merit is displayed at the top of the list, the term with the second highest figure of merit is displayed second on the list, etc.). A term in the first list may be focused on and selected from the list presented. To focus on and select a term in the first list, the user may scroll to a term in the list and/or input (e.g., into a character entry field) a larger part of a desired term until the desired term is displayed, which can then be focused on and selected by the user, after a term in the first list is selected.

At 1110, a second list (e.g., a subsequent list) of terms may be ranked as a function of the focused term in the first list. The second list may be obtained from terms stored on a hand-held device, for example, and ranked according to some figure of merit related to the term focused on in the first list (e.g., commonly used search terms that appear in a phrase after the term focused on from the first list). If a user focuses on a different term in the first list, a term's rank in the second list will be adjusted as different terms in the first list are focused on (e.g., highlighted). As a function of the size of an associated display, a certain number of terms on the second list may be displayed at 1112. In one example, fewer than all the terms in the second list may be presented at once (e.g., due to the compactness of a display), and a placeholder may be used to represent undisplayed terms. At 1114, the second list of terms is displayed in a ranked order (e.g., the term with the highest figure of merit relative to the term focused on in the first list is displayed at the top of the list, the term with the second highest figure of merit is displayed second on the list, etc.). A user may scroll to, focus on, and select a term in the second list.

Once a term in the first list and a term in the second list have been selected, a phrase may be generated at 1116 and accepted by the user. This phrase may then be entered into the character entry field. The process can be repeated for additional lists (e.g., additional, subsequent list), the contents of which is a function of the term(s) focused on and selected in the prior list(s), and terms can be focused on and selected in these lists to expand the phrase, for example. Alternatively, where additional lists are presented, a user can halt the process by accepting the phrase as constructed (e.g., presenting the phrase in a character entry field where a query is conducted based upon the currently established or constructed phrase).

Figure 12:
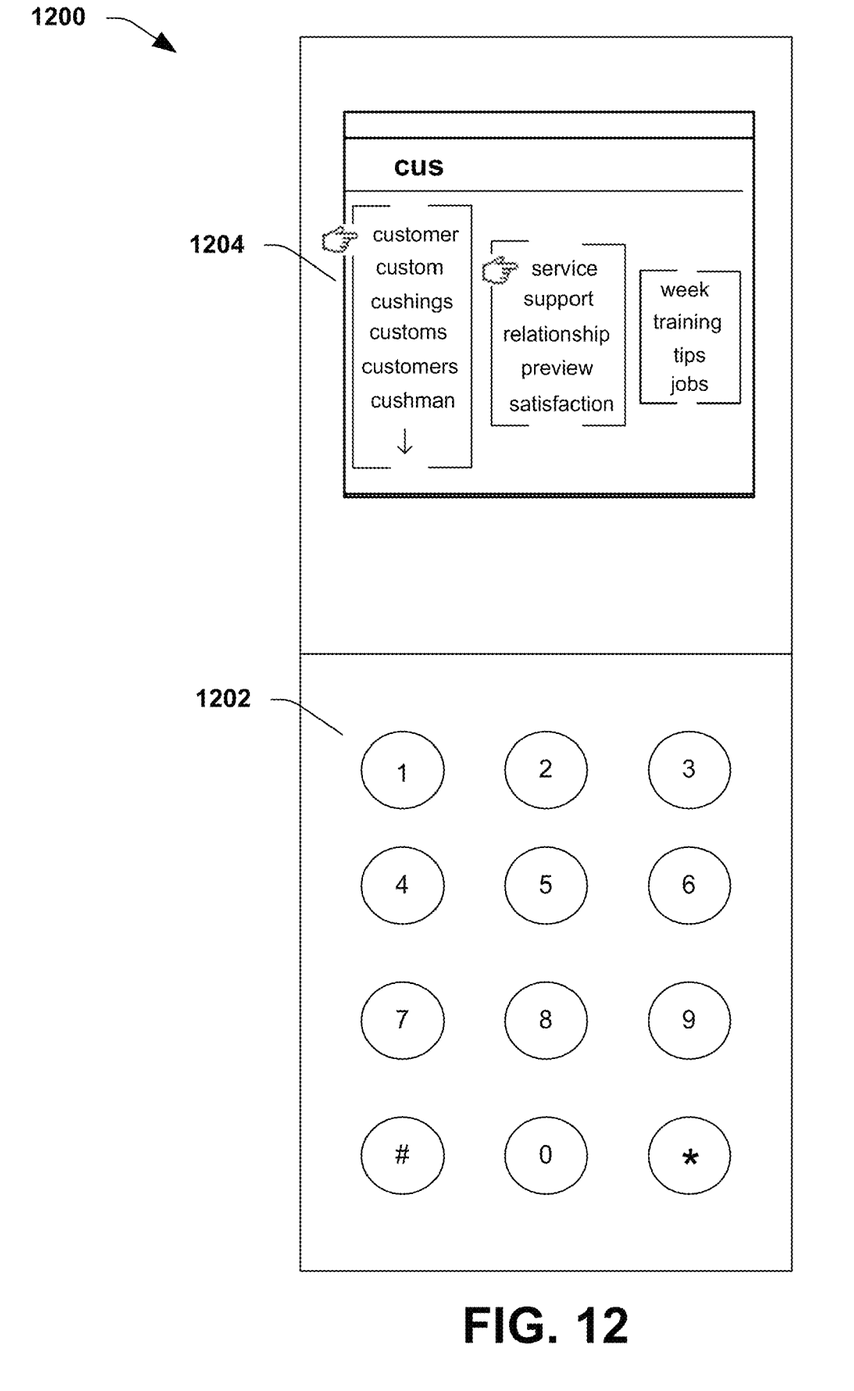
FIG. 12 illustrates an exemplary device where a phrase can be constructed as provided herein.

By way of example, FIG. 12 illustrates one device where a phrase generator can be implemented as provided herein. It comprises a hand-held device 1200 with a numerical keyboard 1202, and a display 1204. The output of a phrase generator may appear on the screen as illustrated, for example. Implementing a phrase generator as provided herein would be useful because of the difficulties (e.g., a limited number of keys, multiple terms assigned to a key, the size of the keys) associated with typing on the (relatively small) numerical keyboard 1202 or other miniature input device (e.g., a keyboard or virtual keyboard).

Figure 13:
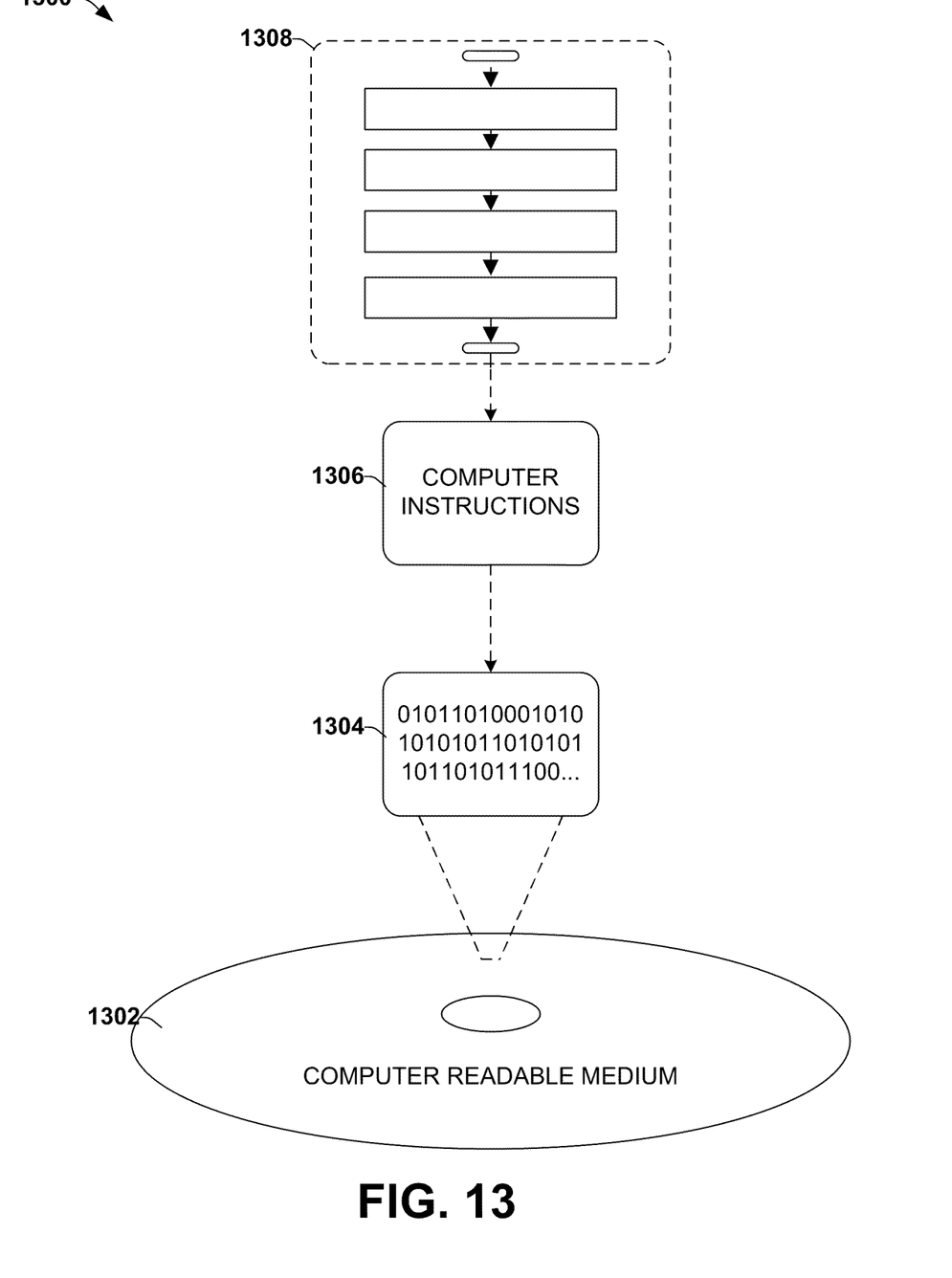
FIG. 13 is an illustration of an exemplary computer-readable medium comprising processor-executable instructions configured to embody one or more of the provisions set forth herein.

Still another embodiment involves a computer-readable medium comprising processor-executable instructions configured to implement one or more of the techniques presented herein. An exemplary computer-readable medium that may be devised in these ways is illustrated in FIG. 13, wherein the implementation 1300 comprises a computer-readable medium 1302 (e.g., a CD-R, DVD-R, or a platter of a hard disk drive), on which is encoded computer-readable data 1304. This computer-readable data 1304 in turn comprises a set of computer instructions 1306 configured to operate according to one or more of the principles set forth herein. In one such embodiment 1300, the processor-executable instructions 1306 may be configured to perform a method, such as the exemplary methods 100 and 1100 of FIGS. 1 and 11, for example. In another such embodiment, the processor-executable instructions 1306 may be configured to implement a system, such as the exemplary system 1000 of FIG. 10, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 14:
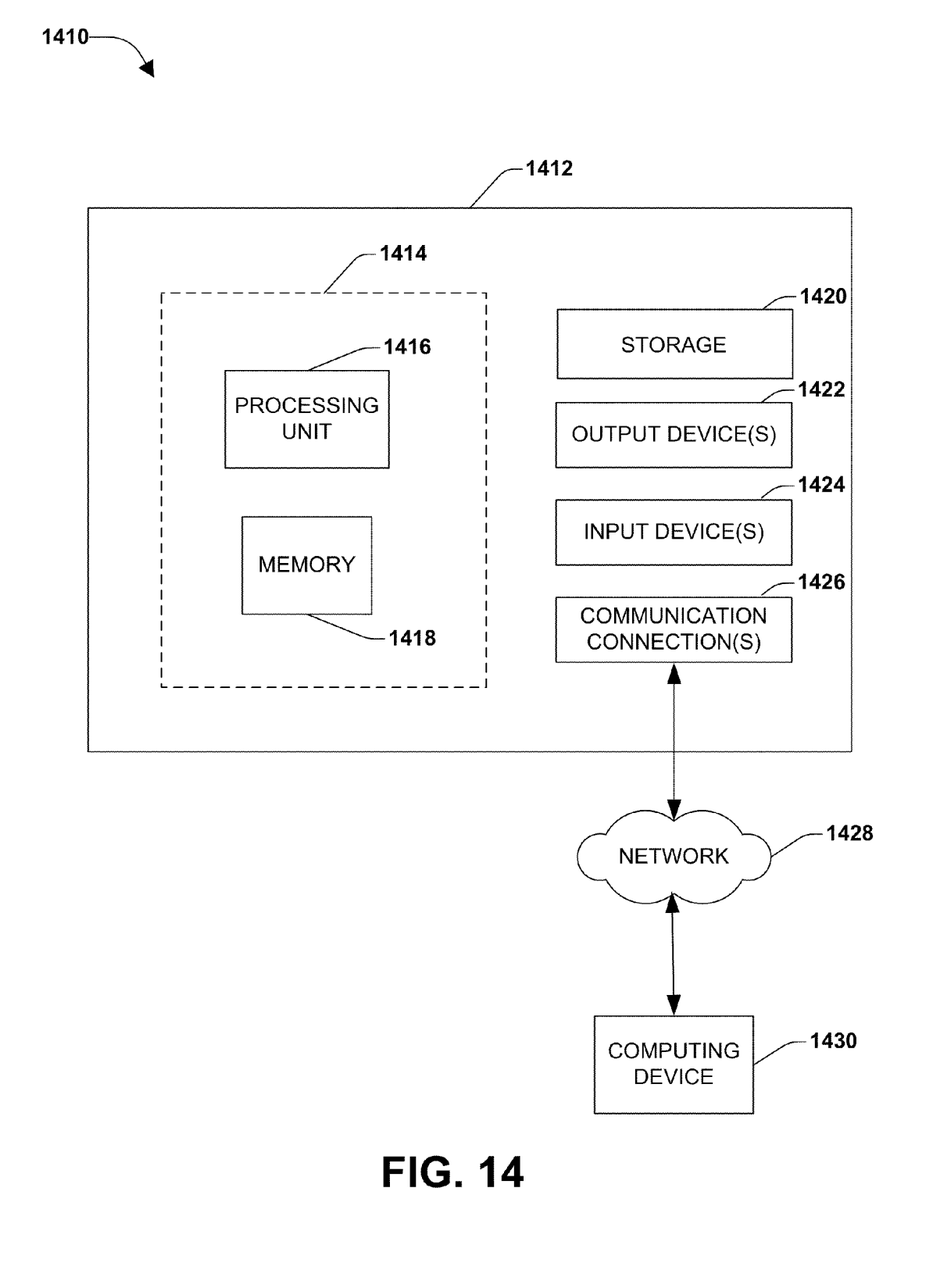
FIG. 14 is an exemplary computing environment wherein one or more provisions set forth herein may be implemented.

FIG. 14 and the following discussion provide a brief, general description of a suitable computing environment to implement embodiments of one or more of the provisions set forth herein. The operating environment of FIG. 14 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 14 illustrates an example of a system 1410 comprising a computing device 1412 configured to implement one or more embodiments provided herein. In one configuration, computing device 1412 includes at least one processing unit 1416 and memory 1418. Depending on the exact configuration and type of computing device, memory 1418 may be volatile (such as RAM, for example), non-volatile (such as ROM, flash memory, etc., for example) or some combination of the two. This configuration is illustrated in FIG. 14 by dashed line 1414.

In other embodiments, device 1412 may include additional features and/or functionality. For example, device 1412 may also include additional storage (e.g., removable and/or non-removable) including, but not limited to, magnetic storage, optical storage, and the like. Such additional storage is illustrated in FIG. 14 by storage 1420. In one embodiment, computer readable instructions to implement one or more embodiments provided herein may be in storage 1420. Storage 1420 may also store other computer readable instructions to implement an operating system, an application program, and the like. Computer readable instructions may be loaded in memory 1418 for execution by processing unit 1416, for example.

The term "computer readable media" as used herein includes computer storage media. Computer storage media includes volatile and nonvolatile, removable and non-removable media implemented in any method or technology for storage of information such as computer readable instructions or other data. Memory 1418 and storage 1420 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1412. Any such computer storage media may be part of device 1412.

Device 1412 may also include communication connection(s) 1426 that allows device 1412 to communicate with other devices. Communication connection(s) 1426 may include, but is not limited to, a modem, a Network Interface Card (NIC), an integrated network interface, a radio frequency transmitter/receiver, an infrared port, a USB connection, or other interfaces for connecting computing device 1412 to other computing devices. Communication connection(s) 1426 may include a wired connection or a wireless connection. Communication connection(s) 1426 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 1412 may include input device(s) 1424 such as keyboard, mouse, pen, voice input device, touch input device, infrared cameras, video input devices, and/or any other input device. Output device(s) 1422 such as one or more displays, speakers, printers, and/or any other output device may also be included in device 1412. Input device(s) 1424 and output device(s) 1422 may be connected to device 1412 via a wired connection, wireless connection, or any combination thereof. In one embodiment, an input device or an output device from another computing device may be used as input device(s) 1424 or output device(s) 1422 for computing device 1412.

Components of computing device 1412 may be connected by various interconnects, such as a bus. Such interconnects may include a Peripheral Component Interconnect (PCI), such as PCI Express, a Universal Serial Bus (USB), firewire (IEEE 1494), an optical bus structure, and the like. In another embodiment, components of computing device 1412 may be interconnected by a network. For example, memory 1418 may be comprised of multiple physical memory units located in different physical locations interconnected by a network.

Those skilled in the art will realize that storage devices utilized to store computer readable instructions may be distributed across a network. For example, a computing device 1430 accessible via network 1428 may store computer readable instructions to implement one or more embodiments provided herein. Computing device 1412 may access computing device 1430 and download a part or all of the computer readable instructions for execution. Alternatively, computing device 1412 may download pieces of the computer readable instructions, as needed, or some instructions may be executed at computing device 1412 and some at computing device 1430.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of assisting a user in generating a phrase, comprising:
   presenting at least two terms from a first group of terms;
   presenting at least one term from a second group of terms, where the presented at least one term is a function of a focused on term from the first group of terms, at least two terms from the first group of terms presented concurrently with the presentation of the at least one term from the second group of terms; and
   linking a term selected from the first group of terms with a term selected from the second group of terms to generate the phrase,
   at least some of the method implemented at least in part via a processor.

2. The method of claim 1, comprising:
   receiving user input in a character entry field; and
   presenting the at least two terms from the first group of terms based upon the received user input.

3. The method of claim 2, comprising inserting the generated phrase into the character entry field.

4. The method of claim 2, comprising not inserting the term selected from the first group of terms into the character entry field until the phrase is generated.

5. The method of claim 1, comprising storing the first and second groups of terms on a hand-held device.

6. The method of claim 1, comprising:
   ranking the terms comprised in the first group of terms; and
   presenting the at least two terms from the first group of terms according to the ranking.

7. The method of claim 1, comprising presenting the focused on term from the first group of terms in a manner that is different than a manner in which others terms in the first group of terms are presented.

8. The method of claim 1, comprising inserting the generated phrase into a character entry field.

9. The method of claim 1, comprising using the generated phrase to form a search query for a search engine.

10. The method of claim 1, comprising presenting a placeholder in place of at least one of:
    at least one term from the first group of terms; or
    at least one term from the second group of terms.

11. The method of claim 1, comprising changing at least one of the terms presented from the second group of terms when the focused term from the first group of terms is altered.

12. A computer readable storage device comprising computer-executable instructions that when executed via a processor perform a method for assisting a user in generating a phrase, comprising:

presenting at least two terms from a first group of terms;
presenting at least one term from a second group of terms, where the presented at least one term is a function of a focused on term from the first group of terms, at least two terms from the first group of terms presented concurrently with the presentation of the at least one term from the second group of terms; and
linking a term selected from the first group of terms with a term selected from the second group of terms to generate the phrase.

13. The computer readable storage device of claim 12, the method comprising:
receiving user input in a character entry field; and
presenting the at least two terms from the first group of terms based upon the received user input; and
inserting the generated phrase into the character entry field.

14. The method of claim 1, comprising storing terms in a mobile device, where terms with prefixes less than or equal to a desired threshold are stored in a hash table and terms with prefixes greater than a desired threshold are stored in an index.

15. A system, comprising:
one or more processing units; and
memory comprising instructions that when executed by at least some of the one or more processing units, perform a method comprising:
presenting at least two terms from a first group of terms;
presenting at least one term from a second group of terms, where the presented at least one term is a function of a focused on term from the first group of terms, at least two terms from the first group of terms presented concurrently with the presentation of the at least one term from the second group of terms; and
linking a term selected from the first group of terms with a term selected from the second group of terms to generate the phrase.

16. The system of claim 15, the method comprising:
receiving user input in a character entry field; and
presenting the at least two terms from the first group of terms based upon the received user input.

17. The system of claim 16, the method comprising inserting the generated phrase into the character entry field.

18. The system of claim 16, the method comprising not inserting the term selected from the first group of terms into the character entry field until the phrase is generated.

19. The system of claim 15, the method comprising storing the first and second groups of terms on a hand-held device.

20. The system of claim 15, the method comprising:
ranking the terms comprised in the first group of terms; and
presenting the at least two terms from the first group of terms according to the ranking.

* * * * *